United States Patent

Gibson, Jr. et al.

[15] 3,706,646

[45] Dec. 19, 1972

[54] METHOD FOR REMOVING SOLIDS BUILD-UP FROM CATHODES OF ELECTROLYTIC CELL

[72] Inventors: Fred D. Gibson, Jr., 4546 Carriage Lane, Las Vegas, Nev. 89109; Raymond C. Rhees, 657 6th Street, Boulder City, Nev. 89005; James I. Gilson, 806 Park Lane, Henderson, Nev. 89015; Bruce B. Halker, 147 Ivy, Henderson, Nev. 89015

[22] Filed: Oct. 28, 1970

[21] Appl. No.: 84,779

[52] U.S. Cl. ................. 204/149, 204/272, 204/277
[51] Int. Cl. .......... C02b 1/82, C02c 5/12, B01k 3/00
[58] Field of Search ...................... 204/149, 272, 277

[56] References Cited

UNITED STATES PATENTS

| | | | |
|---|---|---|---|
| 470,181 | 3/1892 | Collins | 204/277 X |
| 478,048 | 6/1892 | Collins | 204/277 X |
| 558,052 | 4/1896 | Encke & Frolich | 204/277 |
| 563,093 | 6/1896 | Szontagh et al. | 204/277 X |
| 1,194,000 | 8/1916 | Dobyns et al. | 204/277 X |
| 2,530,524 | 11/1950 | Hlavin | 204/272 X |
| 2,997,430 | 8/1961 | Foyn | 204/151 |
| 3,378,478 | 4/1968 | Colvin et al. | 204/248 |

Primary Examiner—John H. Mack
Assistant Examiner—A. C. Prescott
Attorney—William D. Hall, Elliott I. Pollock, Fred C. Philipitt, George Vande Sande, Charles F. Steininger and Robert R. Priddy

[57] ABSTRACT

Apparatus and method for removing solids which build up on the cathode of an electrolytic cell, particularly an electrolytic cell used in the treatment of waste water such as sewage or industrial wastes. The cell preferably comprises a metallic hollow tube which may form the cathode, and a lead dioxide-coated anode disposed within, but electrically insulated from, the encircling cathode. The electrolyte flows through the cell in the space between the anode and encircling cathode. In the electrolytic treatment of organic and inorganic waste materials, various chemical deposits, particularly including calcium and magnesium salts of orthophosphate and carbonate as well as calcium and magnesium hydroxide tend to become deposited on the cathode surface and soon prevent proper cell operation. Such deposits are removed periodically by injecting pressurized air into the cell at preselected time intervals. During periods of air injection, a predetermined minimum amount of air is injected dependent upon the rate of liquid flow through the cell.

8 Claims, 4 Drawing Figures

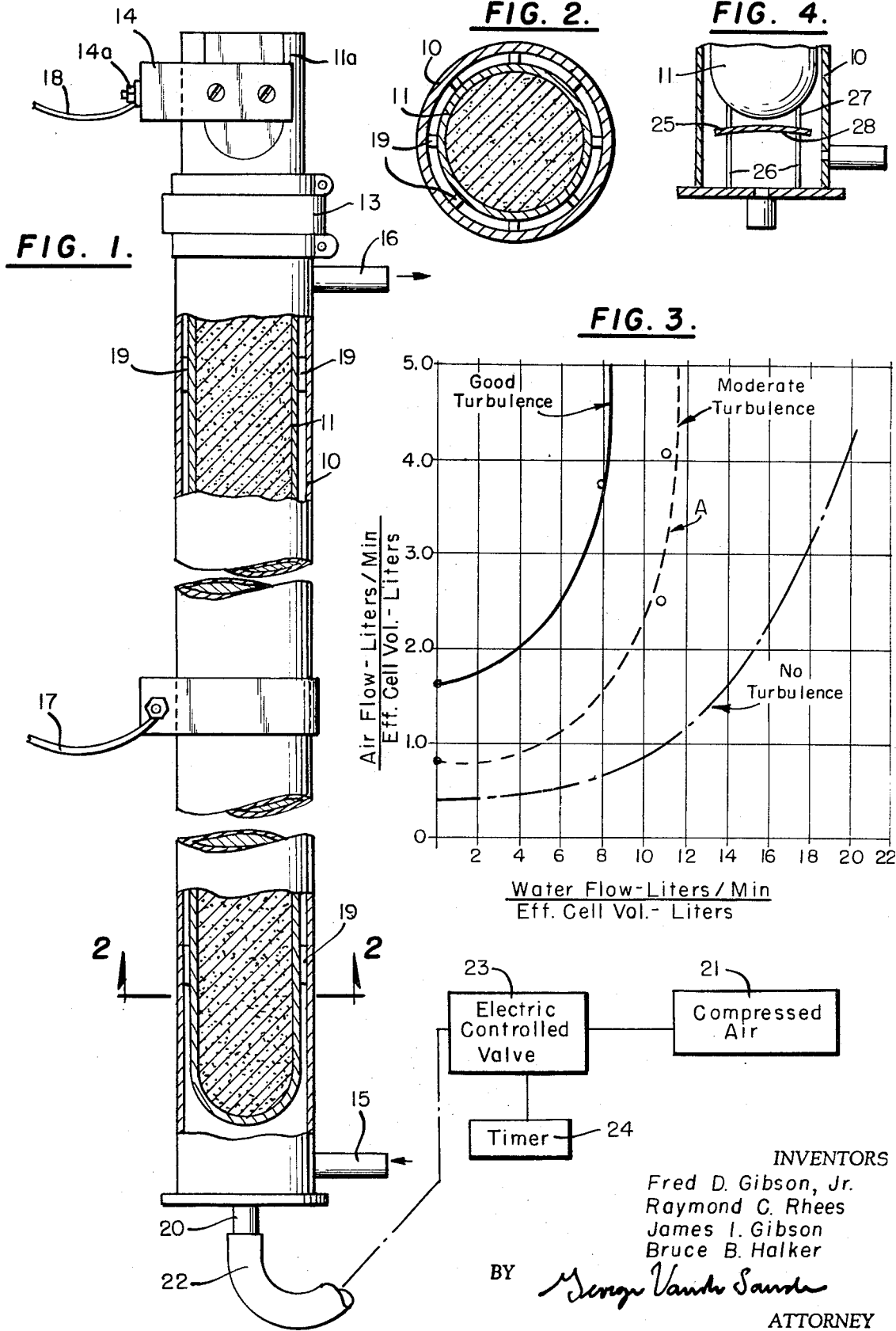

METHOD FOR REMOVING SOLIDS BUILD-UP FROM CATHODES OF ELECTROLYTIC CELL

BACKGROUND OF THE INVENTION

The electrolytic treatment of waste water, both sewage and industrial wastes, is known in the prior art. However, such systems in the past have proved to be not entirely satisfactory, and one of the principal reasons appears to have been that such attempts to employ electrolytic treatment tended to depend almost solely on such electrolytic treatment for purification and disinfection of the waste water, and this has proved to be quite impractical. The reasons for the impracticality of such attempts have been that it has been impossible to obtain, with feasible amounts of electric power, the required reductions in B.O.D. and C.O.D., reductions in odor and clarity and in color when solely electrolytic treatment has been used. A further drawback to the prior art systems of electrolytic treatment has been the unavailability of a practical anode having long life, reasonably low cost, dimensional stability, and highly oxidative properties.

A further impediment to the successful use of electrolytic processes in the treatment of waste waters has been an unwanted build-up of solids on the cathode. It has been found that such deposits can accumulate on the cathode surfaces quite quickly, often in a matter of only a few hours, and removal of such solids is necessary in order to ensure continued satisfactory operation of the cell since such deposits, if allowed to accumulate, reduce cell efficiency, cell capacity, and cell life. It has been found to be entirely impractical to shut down a cell periodically in order to remove such accumulated solids, and heretofore no satisfactory manner of removing such solids has been found.

SUMMARY OF THE INVENTION

We have found that all of the foregoing disadvantages to the use of electrolytic treatment of waste waters can be overcome. Thus, we have found that electrolytic methods of treatment should not, in order to be practical, be used as the sole means of treating waste water, at least where very large quantities of waste water are to be treated, but rather that electrolytic treatment should be judiciously applied at certain places and under certain conditions in a waste water treatment plant in order to provide greatly improved operation of the entire system with an economical installation of equipment and, moreover, an installation whose operating costs, particularly respecting the amount of electric power required, are entirely reasonable.

We have also found that a lead dioxide anode, with the lead dioxide plated as a tough, impervious, dense coating on a substrate such as graphite or titanium metal, provides an entirely satisfactory answer to the long-standing problem of finding a suitable anode material. The improved anode which we have found to be highly desirable for such use is of the kind disclosed and claimed in U.S. Pat. No. 2,945,791 and also in U.S. Pat. No. 3,463,707, both of which are assigned to the assignee of the present application.

We have now also found an entirely satisfactory solution to the problem of removing the solids which regularly accumulate on the cathode surfaces of the cells. Thus, we have found that such deposits can readily be prevented from accumulating to a degree where they will interfere with the operation of the cells by periodically injecting into each cell a quantity of a pressurized gas, preferably air, which then becomes effective to dislodge the growing deposit of solids on the cathode and to so alter the pH profile in the immediate vicinity of the cathode surface to inhibit the further accumulation of solids so that essentially continuous operation of the unit can occur. Preferably, this method of gas injection into a cell is used in connection with a cell construction comprising an outer cylindrical container formed of metal and comprising the cathode of the cell, together with a lead dioxide-coated cylindrical anode which is positioned within the encircling cathode shell but spaced and electrically insulated therefrom. The space between the anode and cathode is deliberately maintained quite small and this space is flooded with electrolyte. The air or gas injected into a cell is injected into the bottom of the exterior cathode cell container and moves with considerable velocity through the anode-cathode space, thereby tending, in effect, to scrub the cathode surface and remove deposited material therefrom. Incidentally, the invention is not necessarily limited to a cell having the above-described configuration, but is also applicable to other configurations including a cell in which the anodes and cathodes are in the form of flat parallel sheets.

We are aware that it is known in the art generally to inject air or another suitable gas into an electrolytic cell. Despite this, the prior art does not appear to teach the concept of injecting air bursts into the bottom of a cell which is constructed to provide a relatively close spacing between the anode and cathode surfaces, and with such spacing being substantially wholly unobstructed for the flow of electrolyte and gas therebetween, in order that each injected gas burst can flow upwardly with high velocity over substantially the entire cathode surface and remove therefrom a build-up of solids that has accumulated thereupon.

In the Shirley U.S. Pat. No. 3,394,067, there is a disclosure of a method and apparatus for injecting a gas or a vapor into the bottom of an electrolytic cell wherein the anode-cathode spacing is filled with a porous filter mass. The filter mass may comprise polyurethane foam used for the entrapment of solids, and the purpose of the gas injection is to clean or unload the filter mass. Other patents disclose the concept of injecting a gas into a cell to agitate the electrolyte as, for example, the patent to Baker et al., U.S. Pat. No. 2,870,067, and two patents to Humphreys, U.S. Pat. Nos. 390,675 and 390,677, are concerned with the dislodging of polarizing gases from the cathode by mechanically carrying air into the solution which will react with the nascent hydrogen which is formed at the cathode. The patent of Marks, U.S. Pat. No. 2,370,871, is directed to an analytical detection device but in no way teaches the concept of the removal of solids from the cathode surfaces, nor does this patent disclose the concept of injecting air or another gas, instead using a fluid for producing a jet.

Thus, as stated above, the known prior art does not disclose the essential concept of this invention which is to prevent the accumulation of a solids build-up on the cathodes of electrolytic cells wherein waste water is being electrolytically treated.

BRIEF DESCRIPTION OF THE DRAWINGS

In describing the invention, reference will be made to the accompanying drawings in which:

FIG. 1 is an elevational view in cross-section of a typical electrolytic cell of the kind used for the treatment of waste water, illustrating also the means for injecting bursts of a pressurized gas into the cell bottom;

FIG. 2 is a cross-sectional view of the cell of FIG. 1 taken along the section line 2—2, FIG. 3 graphically illustrates the relation between water flow rate and rate of air injection for different levels of turbulence; and FIG. 4 illustrates a modified embodiment of the apparatus of the invention.

DETAILED DESCRIPTION OF THE PREFERRED EMBODIMENT

As previously stated, it has been found in the electrolytic treatment of waste water that troublesome deposits tend to form on the cathode surfaces, and if these are allowed to accumulate, they will eventually build up on the cathode to a degree which will prevent proper operation of the cell. Thus, in the treatment of waste water, the water to be treated is caused to flow through the cell in the anode-cathode space, with the flow generally occurring from the bottom of the cell upwardly through the top. Obviously, this flow is seriously impeded if the anode-cathode space becomes clogged with deposits which build up on the cathode surfaces.

Both natural and polluted waters contain salts of varying solubility. The alkali metal salts are, in general, soluble over all practical pH ranges. Some other salts are, on the other hand, soluble to a degree which is very much dependent upon the pH of the solution, i.e. the higher the pH of the solution, the less insoluble the salt becomes. With respect to alkaline earth ions, these tend to form phosphates and/or carbonates which are quite soluble at high pH levels. Also, the alkaline earth hydroxides are found to be rather insoluble at high pH levels, and these also can contribute to the build-up of deposits.

Hard waters are those which are high in calcium and magnesium. The introduction into such waters of detergents and human wastes increases the amount of phosphorous compounds, i.e. orthophosphate, polyphosphates, and organic phosphorus compounds. In such waters, the polyphosphates, and also to a lesser extent the phosphorous compounds, on prolonged contact with the water, tend to be converted to orthophosphates; this is well known, and causes the resulting discharge from a sewage plant to be objectionable because the presence of such phosphates in the discharge tends to promote the growth of algae in the receiving body of water.

In addition, the effluent from a typical sewage treatment plant is high in bicarbonate ions, not only because of the natural tendency to form concentrations of bicarbonate in domestic water supplies, but also due to the formation of carbon dioxide resulting from the decomposition of organic compounds during the sewage treatment process.

While the various possible compounds of the ionic species, i.e. $Ca^{++}$, $Mg^{++}$, which are present in waste water, such as their orthophosphates, carbonates, and hydroxides, are mainly soluble in sewage plant streams at concentrations in which these compounds are present, an increase in the pH of the solution tends to promote the formation of the less soluble calcium and magnesium salts of orthophosphate and carbonate. Such increase in pH comes about during the electrolytic treatment as the result of reactions at the cathode of the cell which tend to generate hydroxyl ions by the following net reactions in the presence of a suitable electrolyte:

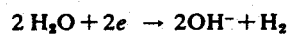

$$2 H_2O + 2e \rightarrow 2OH^- + H_2$$

The hydroxyl ion thus generated raises the pH at the cathode-solution interface, thereby causing calcium and magnesium phosphates, carbonates, and hydroxides, to precipitate on the cathode surface. It should be understood that other combinations of ions may also be present which will form such undesired deposits; in general, any combination of ions whose compounds have decreased solubility with increasing pH will tend to form such deposits. The chemical composition of the deposit actually formed varies dependent upon the relative concentration of the precipitatable ions and also the magnitude of voltage at the cathode. The deposits formed on the cathode tend to be generally soft, slippery to the feel, and can be crystalline or gelatinous.

Analysis of the scale on the cathode of cells used in a typical installation for the treatment of waste water revealed the constituents in order of abundance to be calcium (carbonate species), magnesium (phosphate species), and their hydroxides. The reason for precipitation of these species is thought to be a pH gradient in the cell, which at the cathode becomes basic enough to precipitate pH dependent species such as calcium and magnesium phosphates, carbonates and hydroxides, which then deposit on the cathode wall.

Comparison of various possible precipitating species shows calcium carbonate to be by far the worst offender. Using the following average figures on analyses of the effluent water of a typical treatment plant as comparison standards, the alkalinity (total carbonate species) was 220 ppm, ammonia 17 ppm, total phosphate 15 ppm, and a laboratory analysis for calcium and magnesium showed $Ca^{++}=$ 100 ppm and $Mg^{++}=$ 50 ppm. Calcium carbonate is the first species to precipitate from solution if the pH is raised. At the comparison standards, $Ca_3CO_3$ should precipitate at pH 7.4. $Ca_3(PO_4)_2$ would not start precipitating until a pH of 8.8 and $Ca(OH)_2$ until pH of 13.1. Calculation showed that if equilibrium were established, essentially all of the calcium would precipitate as calcium carbonate. Under cell conditions, however, some calcium could come out as the phosphate. One would expect that very little of the calcium would come out as the more soluble hydroxide due to the very high pH required for appreciable removal. Under conditions of low laminar flow, however, the carbonate in the highly alkaline region of the cathode may be quickly exhausted and calcium phosphate and hydroxide may contribute significantly to the precipitate.

Calcium carbonate presents the biggest problem also from the standpoint of amount of precipitate. Not only will more precipitate because of its lower pH of precipitation, but from the standpoint of molar concentration these two are among the most abundant. While they are also present in almost equimolar concentrations calcium ion will migrate toward the cathode and carbonate away from it so that concentration separation could occur and carbonate ion could be limiting. The molar phosphate concentration is only one-tenth that of the calcium and carbonate concentrations hence phosphate precipitates such as $MgNH_4PO_4$ will only be a tenth as much as the calcium carbonates due to this factor alone. Although the molar $Mg^{++}$ concentration is nearly the same as that of $Ca^{++}$, $MgNH_4PO_4$, $Mg(OH)_2$, and $MgCO_3$ are more soluble than $CaCO_3$ hence magnesium precipitate will not appear to the extent that the calcium precipitates do.

The present invention provides a feasible means for economically lowering of the build-up of scale in the cell.

We have found that such deposits can readily be dislodged from the cathode by vigorous flushing of the cathode surface with water. However, such back-flushing requires that the power be turned off the cell, the usual flow of waste water through the cell be interrupted, and that various valves be operated so as to permit the introduction of high velocity water through the cell to dislodge the accumulated deposit.

In accordance with the present invention, we have discovered that vigorous agitation or turbulence at the cathode-electrode interface can be produced by injecting a pressurized gas, preferably air, into the cell at preselected time intervals. The turbulence of the electrolyte can be controlled both as to frequency and duration by the injection of the gas through a solenoid valve controlled by a timer. The intensity of the turbulence can be controlled by the pressure of the air and by the configuration of the cell.

In general, any cell configuration may be used with fair to excellent results. In the preferred configuration, however, a cylindrical cell is employed as shown, for example, in FIGS. 1 and 2. FIG. 1 shows a cylindrical outer shell 10 of metal which may be connected as either the cathode or the anode in the system. Within the outer shell is a cylinder 11 of smaller diameter which comprises the other electrode. Preferably, the inner electrode comprises the anode which is constructed in accordance with the teachings of the aforementioned patents and therefore comprises an anode having a coating of lead dioxide bonded to a substrate of graphite or titanium. The interior anode 11 is secured in position by an encircling connector element 13 which also insulates anode 11 from cathode 10. The end portion 11a of the anode extends outwardly through connector 13, and an electrical connector 14 bolts to the anode substrate at its outwardly extended end. The electrical connecting wire 18 may be secured to such connector 14 by means of a bolt 14a.

As can be seen in FIG. 1, an inlet conduit 15 is provided near the bottom of the outer electrode, and a similar outlet conduit 16 for electrolyte is provided adjacent the top end of the outer electrode. Electrical connections are made to both the cathode and the anode at 17 and 18, respectively. The cross-sectional view of FIG. 2 shows that the spacing between anode and cathode is quite small. In a typical installation, this spacing may be in the order of three-sixteenths of an inch. The desired uniform spacing between the anode and cathode surfaces may be provided by circumferentially dispersed spacing elements 19, a plurality of which may be provided at axially spaced locations shown in FIG. 2.

FIG. 1 shows that the exterior electrode, which is preferably the cathode, is provided with an air inlet 20 which is connected to a source of compressed air 21 by a suitable pipe or hose 22. The air line interconnecting the source 21 with the air inlet 20 is provided with an electrically operated valve 23 whose operation is controlled by an electric timer 24. The timer periodically opens the valve for a predetermined interval of time to permit a predetermined volume of air to be supplied to the bottom of the cell from the compressed air source 21. The resulting bubble of air or other suitable gas travels rapidly upwardly through the inner electrode space in the cell and tends to scrub the cathode surface clean of any clinging deposits.

It has been found that somewhat better results are obtained by providing the air injection at spaced intervals rather than continuously; this is believed to result from the fact that periodic treatment allows a very small deposit to become established on the cathode surface and such thin deposit can quite readily be detached from the cathode surface when the air is injected. Thus, the injection of air at 30 minute intervals has been found to produce quite satisfactory results.

It should be understood that any number of such anode-cathode cell assemblies can be grouped together and each can be connected through a separate air conduit to the compressed air source 21 and controlled by the single electrically-operated valve 23.

We have found by extensive testing that there is a close correlation between the amount of turbulence produced in the electrolyte in the anode-cathode spacing by the injected air and the ability of such air injection to remove scale deposits from the cathode surface. Such experiments have involved the construction of simulated cells which duplicate in all respects the geometry of the cell of FIGS. 2 and 3 and with a transparent container substituted for the outer cathode shell to permit visual observation of the physical action occurring as the result of air injection.

The tests have shown that the size of the bubbles produced as a result of air injection constitutes an important factor in the ability to remove deposits, large bubbles being substantially more effective than small bubbles. It is believed that a bubble having a diameter which is a multiple of the anode-cathode radial spacing is desirable, the reason for this being that such a bubble is in effect flattened out very considerably as it travels upwardly through the cell in the confined space between the anode and the cathode, the latter space being in the order of only three-sixteenths of an inch, as previously mentioned.

Any air bubble, as is well known, tends to assume a spherical shape in order to provide thereby the minimum amount of surface area, and the extreme bubble flattening which necessarily occurs as the bubble travels through the confined anode-cathode radial space requires the application of fairly considerable amounts of energy. As a result, the bubbles move about rapidly, particularly in the lateral direction, which is surprising since it would ordinarily be expected that the bubbles would tend to move in a fairly linear fashion upwardly through the anode-cathode spacing from the bottom of the cell to the top. The rapid and random movement of the bubbles both laterally and linearly along the cell length is to be extremely effective in removing cathode deposits, and the high degree of turbulence produced by the bubbles can, in fact, be felt as fairly sharp vibrations on the exterior cathode surface.

It was earlier believed that the conditions of high turbulence generated in the electrolyte by the air bubbles could best be promoted by encouraging a turbulent flow as the result of a high flow rate of fluids through the cells. We have found, to the contrary, that turbulence in the electrolyte is more easily obtained with a low rate of fluid flow through the cells. In many applications, particularly where the electrolytic cells are used to treat a side stream, a low flow rate through the cell can quite readily be accommodated since the flow rate is not, under such circumstances, a factor which directly affects the amount of electrolytic treatment that the electrolyte undergoes. Thus, where a side stream of effluent is being treated, a low flow rate permits the effluent to be circulated through the cell less frequently, the amount of electrolytic treatment being primarily a function of the cell parameters including particularly the amount of cell amperage and the amount of fresh flow of effluent into the system.

FIG. 3 illustrates graphically the relationship between water flow through a cell and the minimum amount of air flow to provide desired turbulence levels in the electrolyte. In FIG. 3, the abscissa represents the ratio of water flow through the cell (measured in liters per minute) to the effective cell volume, also measured in liters. The effective cell volume is the volume of the annular space between the anode and the cathode in the cell configuration of FIG. 1, exclusive of the space at the bottom of the cell between the rounded part of the anode and the surrounding cathode wall; thus, the space is that occupied by the confined radial spacing between the anode and cathode surfaces. The ordinate in FIG. 3 represents air flow into the cell and is measured as the ratio of the volume of air flow (liters per minute) to the effective cell volume which is the same as previously described.

FIG. 3 shows that, for one thing, a smaller air volume is required for lower rates of liquid flow through the cell; actually, it can be seen that for high rates of flow as, for example, where the rate of flow per minute is more than eight times the effective cell volume, it is impossible to obtain good turbulence with any rate of air flow.

Experiments have further shown that the relationships graphically illustrated in FIG. 3 are not significantly affected by the size of the orifice through which the air is injected into the cell. The results of FIG. 3 were obtained with an orifice of ¼ inch diameter; the results are not appreciably different with an orifice of ⅜ inch diameter, and also with an orifice of 1/16 inch diameter, although with the latter small orifice the several curves of FIG. 3 are then shifted upwardly somewhat.

The desired operating range for rate of air flow as opposed to a given rate of water flow should preferably be such as to provide at least a moderate level of turbulence (i.e. a rate of air flow at least as great as that represented by Curve A), since such turbulence level will generally be effective to remove deposits of scale from the cathode. Thus, as one example, for a given condition where the rate of flow through the cell per minute is about four times the effective cell volume, FIG. 3 shows that the rate of air flow preferably be at least 1.0 times the effective cell volume.

Insofar as upper limits of air flow are concerned, it is considered that an air flow resulting in a turbulence condition such that about 50 percent of the effective cell volume is at any time occupied by air bubbles represents an upper limit which should preferably not be exceeded. For a typical installation where the cell volume was 2.39 liters, this limiting upper limit of air injection occurred when the air injection reached about 35 liters per minute thus representing a volume of air injected each minute which was about 14.5 times the effective cell volume.

As indicated previously, the principles of the invention are applicable not only to the situation where the cell configuration is cylindrical as shown in FIGS. 1 and 2, but also to the situation where the anode and cathode surfaces are in the form of parallel flat plates which are closely spaced. Such a cell configuration does give some problems, however, particularly in that it then is no longer practical to inject the air into the cell through only a single orifice; instead, it then becomes important to provide a plurality of orifices which are suitably disposed over the bottom of the cell so that the resulting bubbles of air are capable of scouring all the cathode surfaces of the cell. This can, of course, be accomplished although it necessarily does complicate to some extent the air injection apparatus. Experiments have tended to indicate, however, that there is, in addition to simplicity of apparatus, a further important advantage resulting from the use of the cylindrical cell of FIGS. 1 and 2. Thus, the fact that the anode-cathode space is cylindrical rather than planar apparently contributes significantly to the turbulence of the electrolytic flow through the anode-cathode space. As has been mentioned previously, the air bubbles tend to coalesce in this space and also tend to move laterally to a surprising degree as they wend their way upward through the cell. The curvilinear path which is provided by a cylindrical cell configuration is believed to promote turbulence of the electrolyte by reason of the fact that such a path continually imposes acceleration forces on each large bubble traveling in the anode-cathode space.

In connection with the overall objective of providing for large bubbles in the anode-cathode space, i.e. bubbles having a diameter which is a multiple of the radial spacing between the anode and cathode surfaces, it may at times be desirable to employ the alternative embodiment of FIG. 4. In this embodiment, a deflector plate is positioned at the bottom of the cell below the anode. Such plate 25 may, for example, be formed of a plastic material and may have a plurality of depending legs 26 which support it at a predetermined spacing above the bottom surface of the cathode. Preferably, such element 25 also is provided with a plurality of upstanding legs 27 which bear at their upper ends against the bottom of the anode, thereby maintaining the element 25 in place even though upward forces may at times be exerted on such element 25 when air is injected through air inlet orifices. It will be noted that the bottom surface 28 of element 25 is slightly concave. The function of element 25 is to permit a plurality of air bubbles to coalesce into one large bubble. When the bubble so coalesced under the concave surface reaches a predetermined size, the bubble then tends to move out from under the element 25 and then quickly enters the small anode-cathode spacing. Thus, the real function of element 25 is to maximize the size of the air bubbles traveling upwardly through the electrolyte.

In practicing the invention, the following examples illustrate typical operating conditions which have been employed.

EXAMPLE 1

Forty-cell assemblies of the types shown in FIGS. 1 and 2 were ganged together to treat 50,000 to 70,000 gallons per day of a putrescent supernatant discharge from an anaerobic digester in a sewage treatment plant.

In each cell, the cathode diameter was about 4.75 inches and the diameter of the anode was about 4.375 inches, the cell length being about 40 inches.

The electrolytic treatment produced an essentially odorless effluent which was considerably lighter in color after treatment and which was improved in stability and settleability. Without the use of the air purge treatment of this invention, the solution was required to be interrupted at least once every 8 hours; thus, it was necessary to turn off the power and to back-flush each unit to dislodge the accumulated solids. When, however, the air purge system of this invention was employed, providing three bursts 30 seconds apart every 30 minutes from a source of air pressure at a pressure of 5 pounds per square inch, the solids were removed without interruption of the electrolytic cells. The flow rate of the liquid through each cell was at the rate of 19 liters per minute, and the effective cell volume was 2.39 liters so that the ratio of water flow to effective cell volume was 7.9. During each 30 second burst of air into the cell, the rate of air flow was 3.6 liters per minute, with the effective cell volume equalling 2.39 liters, as mentioned above. The ratio of air flow to the effective cell volume was 1.5. Thus, it can be seen from the graph of FIG. 3 that the amount of air injected during each 30 second burst was sufficient to produce moderate turbulence in the anode-cathode space.

As previously pointed out, the characteristics and composition of the solids varies depending upon the precipitatable ions present and also upon the voltage applied to the cell. Accordingly, some adjustment of time, duration, and intensity of air purge is required to compensate for difference in the accumulated deposits.

EXAMPLE 2

As assemblage of 100 cell units, each of the type shown in FIGS. 1 and 2, and having dimensions corresponding to those stated in Example 1, was immersed at the head end of a chlorine contact chamber in a sewage treatment plant. A flow of effluent plant water was passed through the cell, and the gases generated in each cell caused the effluent to flow upwardly through each cell. Without use of the air purge method of this invention, the cells became ineffective in less than one day due to the accumulation of solids at the cathodes. However, by the use of the air purge system of the invention, which provided, every three minutes, three bursts of air 30 seconds apart, at a pressure of 5 pounds per square inch, the solids never had an opportunity to accumulate to any measurable extent on the cathode surfaces. The rate of liquid flow through the cells was 4 liters per minute, thereby giving a ratio of water flow to effective cell volume of 1.7. The air flow during each 30 second burst was at a rate of 12 liters per minute, thereby giving a ratio of air flow to effective cell volume of 5.0. As seen from FIG. 3, the rate of air flow was such as to provide good turbulence in the liquid anode-cathode space of the cell.

EXAMPLE 3

An assemblage of 104 anode and cathode assemblies of the type shown in FIGS. 1 and 2 and having dimensions the same as those stated in Example 1 was suitably connected to a direct-current power source, and sewage plant effluent water was pumped through the assemblage. The purpose of the electrolytic treatment was to disinfect 6,000,000 gallons of sewage waste water per day to permit the re-use of such water for irrigation. Without the air purge system of the invention, a serious build-up of solids was evident in less than 8 hours of operation. However, using the intermittent air purge system of this invention, providing, every 30 minutes three bursts of air 30 seconds apart, at a pressure of 5 pounds per square inch, the units remained free-flowing and provided the required electrolytic treatment. The rate of liquid flow through the cells was 26 liters per minute, thereby giving a ratio of water flow to effective cell volume of 11. The air flow during each 30 second burst was at a rate of 12 liters per minute, thereby giving a ratio of air flow to effective cell volume of 5.0. As seen from FIG. 3, the rate of air flow was such as to provide moderate turbulence in the liquid anode-cathode space of the cell.

What we claim is:

1. In the electrolytic treatment of an electrolyte having a high concentration of ions and/or molecules having decreasing solubility with increasing alkalinity, the method comprising the steps of:
   a. flowing said electrolyte through the anode-cathode space of a cell having at least one anode and one cathode which have at least the principal portions of their respective surfaces closely spaced and substantially vertical, the anode-cathode spacing being substantially free except for the electrolyte,
   b. energizing said anode and said cathode with a direct-current source,
   c. at times injecting a burst of gas into the bottom of the cell,
   d. providing a discharge for said gas from the top of said cell,
   e. maintaining the rate of gas flow during the time of each gas injection at a level at least of such a magnitude as to produce gas bubbles whose effective diameter in unconfined space in the electrolyte is a multiple of the anode-cathode spacing.

2. The method of claim 1 in which the cell is in the form of a hollow metal tube which comprises the cathode and the anode comprises a tubular rod which is centrally positioned relative to said hollow tubular member.

3. The method of claim 1 in which the rate of air injection in relation to the rate of waste water flow through the cell is at least as great as that represented by curve A of FIG. 3.

4. The method of claim 3 in which the anode-cathode spacing is about three-sixteenths of an inch.

5. The method of claim 3 in which the rate of air injection does not exceed a value where the volume of air injected into the cell each minute is more than about 14.5 times the effective volume of the anode-cathode space of the cell.

6. The method of claim 3 in which the air is injected as a plurality of discrete bursts.

7. The method of claim 6 in which the bursts of air are provided about 30 minutes.

8. The method of claim 7 in which each said burst of air has a duration of about 30 seconds.

* * * * *